(12) United States Patent
Liu

(10) Patent No.: US 7,929,279 B2
(45) Date of Patent: Apr. 19, 2011

(54) NETWORK DEVICE FIXTURE

(75) Inventor: Te-Wei Liu, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 79 days.

(21) Appl. No.: 12/320,380

(22) Filed: Jan. 26, 2009

(65) Prior Publication Data
US 2010/0085704 A1 Apr. 8, 2010

(30) Foreign Application Priority Data

Oct. 2, 2008 (TW) .............................. 97217658 U

(51) Int. Cl.
*H05K 5/00* (2006.01)
*H05K 7/16* (2006.01)
(52) U.S. Cl. ............... 361/679.02; 361/679.4; 361/724; 361/725; 361/726; 361/727; 211/26; 211/184; 312/223.1; 312/223.2
(58) Field of Classification Search .......... 361/724–727, 361/678, 679.49, 679.5, 679.51, 679.52, 361/679.53, 679.54, 688–723, 679.02; 454/184, 454/186; 312/236, 223.1–223.3, 205, 265.1–265.4; 174/16.1–16.3; 248/298.1, 274.1, 122.1, 220.31, 220.41; 211/26, 184
See application file for complete search history.

(56) References Cited

U.S. PATENT DOCUMENTS

| | | | |
|---|---|---|---|
| 6,442,031 B1* | 8/2002 | Liu | 361/727 |
| 6,891,727 B2* | 5/2005 | Dittus et al. | 361/724 |
| 2003/0193781 A1* | 10/2003 | Mori | 361/725 |
| 2004/0120123 A1* | 6/2004 | Mayer | 361/725 |
| 2008/0217497 A1* | 9/2008 | Yang et al. | 248/298.1 |

* cited by examiner

*Primary Examiner* — Jayprakash N Gandhi
*Assistant Examiner* — Jerry Wu
(74) *Attorney, Agent, or Firm* — Bacon & Thomas, PLLC

(57) ABSTRACT

This invention discloses a network device including at least one rail element disposed at both sides of the network device at positions adjacent to the rear of the network device respectively to form a slide rail on each side, and two fixing elements each having a locking portion and a support portion, wherein the locking portion has at least one locking hole and is coupled perpendicularly to the support portion, such that when the network device is installed in a rack and the front of the network device is fixed to the front of the rack, each support portion can be extended into each corresponding slide rail, and each locking portion can be secured to the rear of the rack through each corresponding locking hole.

3 Claims, 7 Drawing Sheets

NETWORK DEVICE FIXTURE

FIELD OF THE INVENTION

The present invention relates to a network device fixture, and more particularly to a network device having at least one rail element disposed on both sides adjacent to the rear of the network device to form a slide rail on each side for receiving a fixing element slid therein, so as to secure the network device on a rack stably through the fixing elements.

BACKGROUND OF THE INVENTION

As information technology advances rapidly, E-Business has become a trend, in addition to the fast development of personal computers (including desktop computers and notebook computers). Personal computers no longer meet specific requirements of companies, and thus related manufacturers have developed network devices (including firewall servers, switches and routers, etc) with professional functions to meet corporate requirements.

In general, a system administrator usually uses a rack for installing and accommodating the network devices to facilitate a central management of the network devices, in hope of improving the working efficiency and the management of the system administrator. In addition to the software maintenance of a server, system administrators also emphasize on the hardware stability of the network devices to prevent a system from breaking down due to any damage of the hardware of the network devices.

With reference to FIG. 1 for conventional short fixing frames 10a, 10b, the short fixing frames 10a, 10b are L-shaped, with an edge secured onto a network device 11 and another edge secured onto a rack 12. If a system administrator wants to install the network device 11 in the rack 12, the system administrator secures edges of one of the two short fixing frames 10a to both sides of the network device 11 respectively at positions adjacent to the front of the network device 11 by a plurality of screws 13a, and then puts the network device 11 into the rack 12, and secures the two short fixing frames 10a onto the rack 12 by the screws 13b. Further, edges of one of the two short fixing frames 10b are secured to both sides of the network device 11 at positions adjacent to the rear of the network device 11 respectively, and a plurality of screws 13c are used for fixing the two short fixing frames 10b onto the rack 12, so that the network device 11 can be fixed in the rack 12 securely.

With reference to FIG. 2, the rear of the network device 11 cannot be fixed to the rear of the rack 22 (as shown at the lower right corner of FIG. 2) if the depth of the network device 11 is smaller than the depth of the rack 22. As a result, the flexible combination of the network device 11 and the rack 22 will be limited significantly. Furthermore, the rear of the network device 11 is not fixed, so that if the weight of the network device 11 exceeds the loads of the short fixing frame 10a and the screws 13a, 13b, the short fixing frames 10a may be twisted and deformed, or the network device 11 may fall off from the short fixing frames 10a, and the network device 11 may be damaged when it is collided. To prevent the aforementioned problems, manufacturers have to design and manufacture the short fixing frames with different lengths to cope with the network devices with different depths. Obviously, the prior art not only incurs a higher production cost, but also requires a higher level of difficulty on the management of components and materials.

Therefore, it is an important subject for the invention to overcome the shortcomings of the conventional short fixing frames and network devices by a network device fixture, so that system administrators can install the network device into the rack quickly, so as to enhance the working efficiency and the flexible combination of the network device and the rack.

SUMMARY OF THE INVENTION

In view of the foregoing shortcomings of the short fixing frame and the network device in accordance with the prior art, the inventor of the present invention based on years of experience in the related industry to conduct extensive researches and experiments, and finally developed a network device fixture in accordance with the present invention to overcome the shortcomings of the prior art.

Therefore, it is a primary objective of the present invention to provide a network device fixture comprising a network device and two fixing elements, wherein the network device has at least one rail element (such as rollers and H-shaped rivets) disposed on both sides adjacent to the rear of the network device to form a slide rail on each side of the network device. The fixing element comprises a locking portion and a support portion, and the locking portion includes at least one locking hole disposed thereon, and the support portion is coupled perpendicularly to the locking portion. When the network device is installed in a rack, and the front of the network device is fixed to the front of the rack (such as fixing an edge of the conventional short fixing frame to the front of the network device, and fixing another edge of the short fixing frame to the front of the rack), then the support portion of each fixing element is slid into each corresponding slide rail, and each locking portion can be secured to the rear of the rack through each corresponding locking hole, so that the network device can be stored in the rack stably. After the system administrator installs the network device in the rack and fixes the front of the network device to the front of the rack, it is not necessary to secure each support portion to each side of the network device by components such as the screws anymore, but the system administrator simply needs to slide each support portion into each corresponding slide rail and fix each locking portion to the rear of the rack, so that the two fixing elements can support the network device securely.

Another objective of the present invention is to support the network device securely by sliding the support portion of the fixing element into the slide rail. Even if the depth of the network device is smaller than the depth of the rack, each fixing element still can support the weight of the network device by each support portion, when the locking portion is secured to the rack. Such arrangement not only improves the flexible combination of the network device and the rack, but also enhances the convenience and the stability of the installation significantly.

A further objective of the present invention is to create at least one opening on the support portion of the fixing element, so as to prevent the support portion from hindering the heat dissipation of the network device and reduce the weight of the fixing element or the material consumption. System administrators can fix the network device by the fixing element quickly and easily.

Another objective of the present invention is to dispose at least one auxiliary rail element on both sides of the network device adjacent to the rear of the network device. The rail elements and the auxiliary rail elements form the slide rails on both sides of the network device correspondingly, so that the support portion can be slid into each corresponding slide rail.

DETAILED DESCRIPTION OF THE PREFERRED EMBODIMENTS

Figure 1:
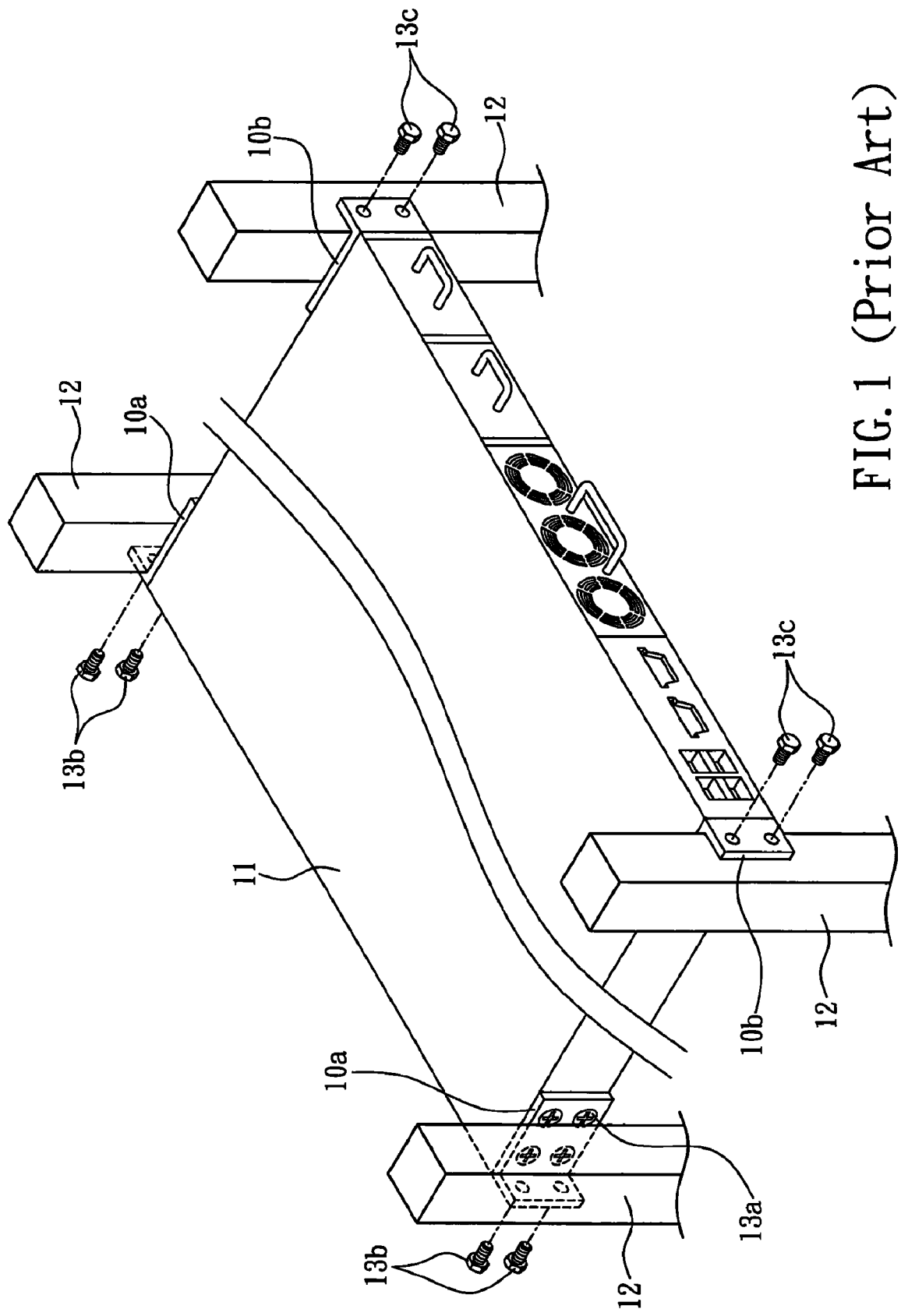
FIG. 1 is a perspective view of a rack, a short fixing frame and a network device in accordance with a prior art.
Figure 2:
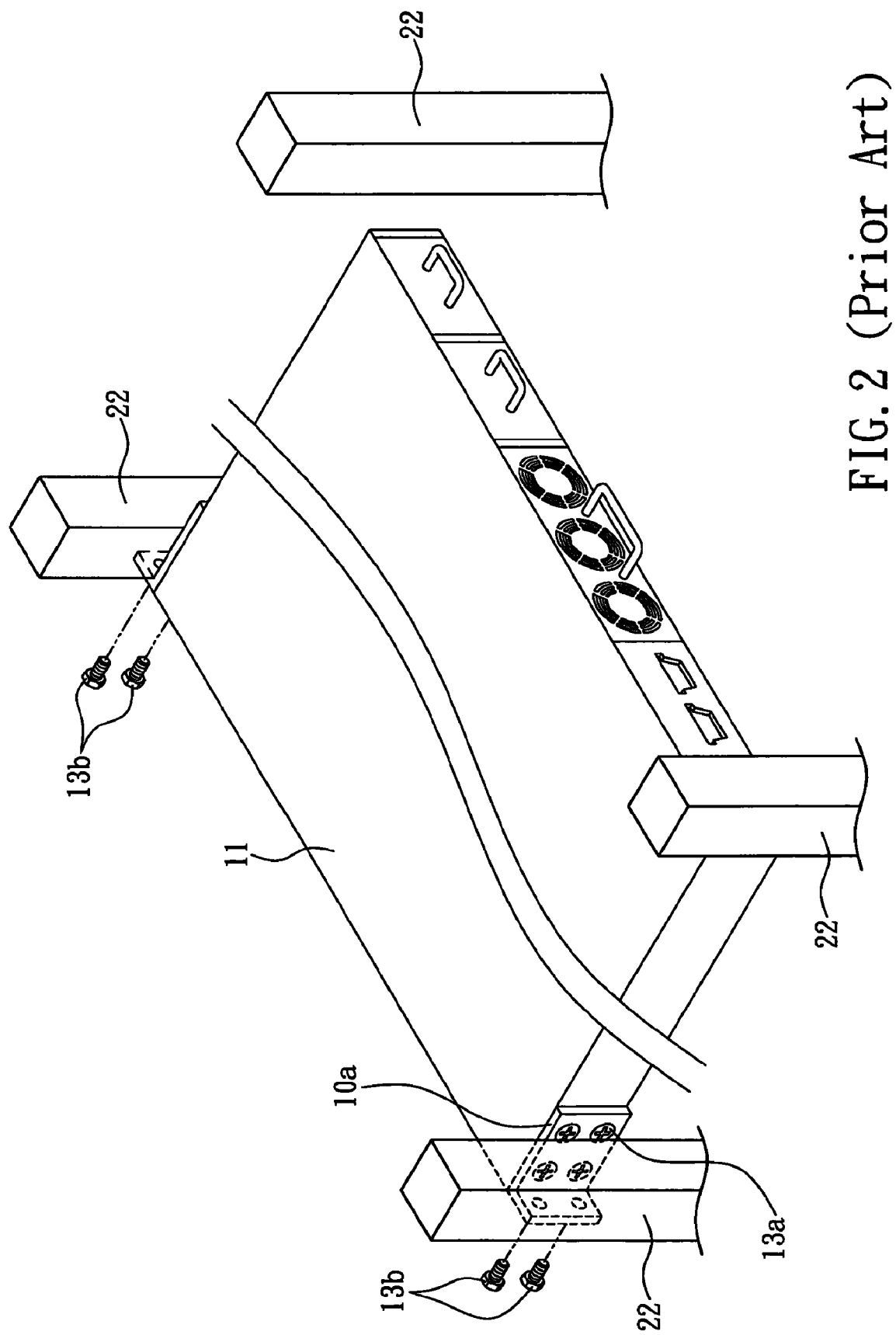
FIG. 2 is another perspective view of a rack, a short fixing frame and a network device in accordance with a prior art.
Figure 3:
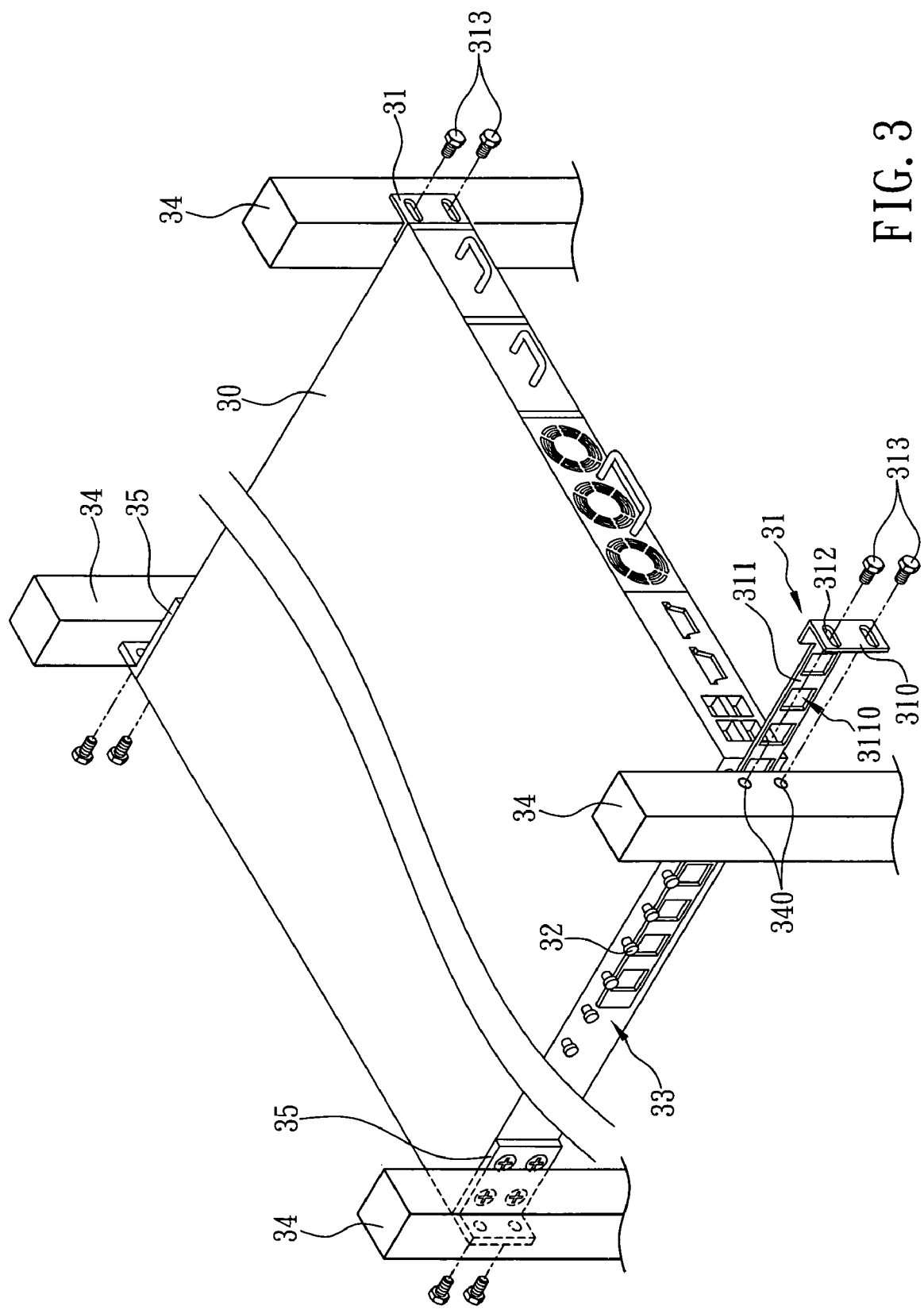
FIG. 3 is a perspective view of a first preferred embodiment of the present invention.
Figure 4:
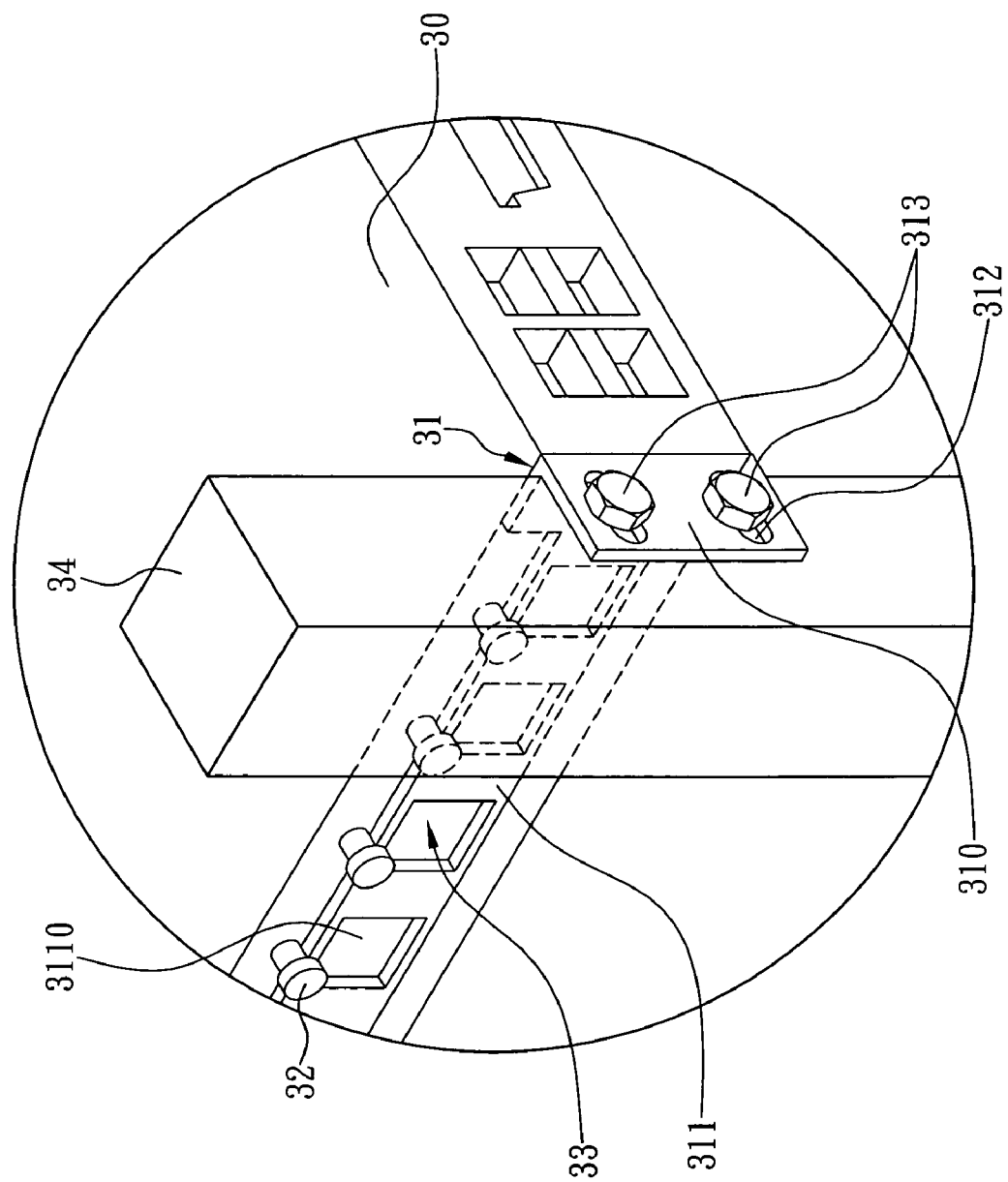
FIG. 4 is an enlarged view of a portion of a first preferred embodiment of the present invention.

With reference to FIGS. 3 and 4 for a network device fixture in accordance with a first preferred embodiment of the present invention, the network device fixture comprises a network device 30 and two fixing elements 31, wherein at least one rail element 32 is disposed on both sides of the network device 30 adjacent to the rear of the network device 30 to form a slide rail 33 on each side of the network device 30. In this embodiment, each rail element 32 is a roller, and the rail elements 32 form the slide rail 33 on both sides of the network device 30 respectively. Although the slide rail 33 is formed by consecutive rollers in this embodiment, the present invention is not limited to such arrangement, and manufacturers can substitute the rollers by H-shaped rivets or other components to form a slide rail 33 on both sides of the network device 30 respectively during the process of manufacturing the network device fixture. Any modification easily conceived by those ordinarily skilled in the art is intended to be covered by the claims of the present invention.

The fixing element 31 is comprised of a locking portion 310 and a support portion 311, wherein two locking holes 312 are disposed on the locking portion 310, and the locking portion 310 is coupled to the support portion 311, and the included angle between the support portion 311 and the locking portion 310 is equal to 90°, such that the fixing element 31 is substantially L-shaped. However, the invention is not limited to such arrangement, but manufacturers can change the included angle between the support portion 311 and the locking portion 310 according to the shape of the network device 30. If the network device 30 is installed in a rack 34, an edge of each short fixing frame 35 is fixed onto the network device 30 at a position adjacent to the front of the network device 30, and another edge of each short fixing frame 35 is fixed to the front of the rack 34 (as shown in the upper left corner of FIG. 3), the support portion 311 of each fixing element 31 can be slid into each corresponding slide rail 33 from the rear of the rack 34 (as shown in the lower right corner of FIG. 3). In other words, each fixing element 31 can be slid into the slide rail 33 disposed on each corresponding side of the network device 30. In addition, a fixing hole 340 is disposed at the rear of the rack 34 and corresponding to each locking hole 312. Four screws 313 are passed through the locking holes 312 and secured into the fixing holes 340 respectively, so that each locking portion 310 can be secured to the rear of the rack 34, and the network device 30 can be stored in the rack 34 securely.

In the first preferred embodiment, if a system administrator wants to install the network device 30 in the rack 34, the system administrator simply needs to push the network device 30 into the rack 34 and fix the front of both sides of the network device 30 to the front of the rack 34 (by using the short fixing frames 35). The system administrator no longer needs to secure each support portion 311 to both sides of the network device 30 by components such as screws, but the system administrator simply slides each support portion 311 into each corresponding slide rail 33, and then fixes each locking portion 310 to the rear of the rack 34, so that the four fixing elements 31 can support the network device 30 securely. Such arrangement not only improves the system administrator's efficiency of installing the network device 30, but also expedites the process of removing the network device 30 from the rack 34 when it is necessary to replace or maintain the network device 30, and greatly improves the convenience of maintaining the network device 30.

Figure 5:
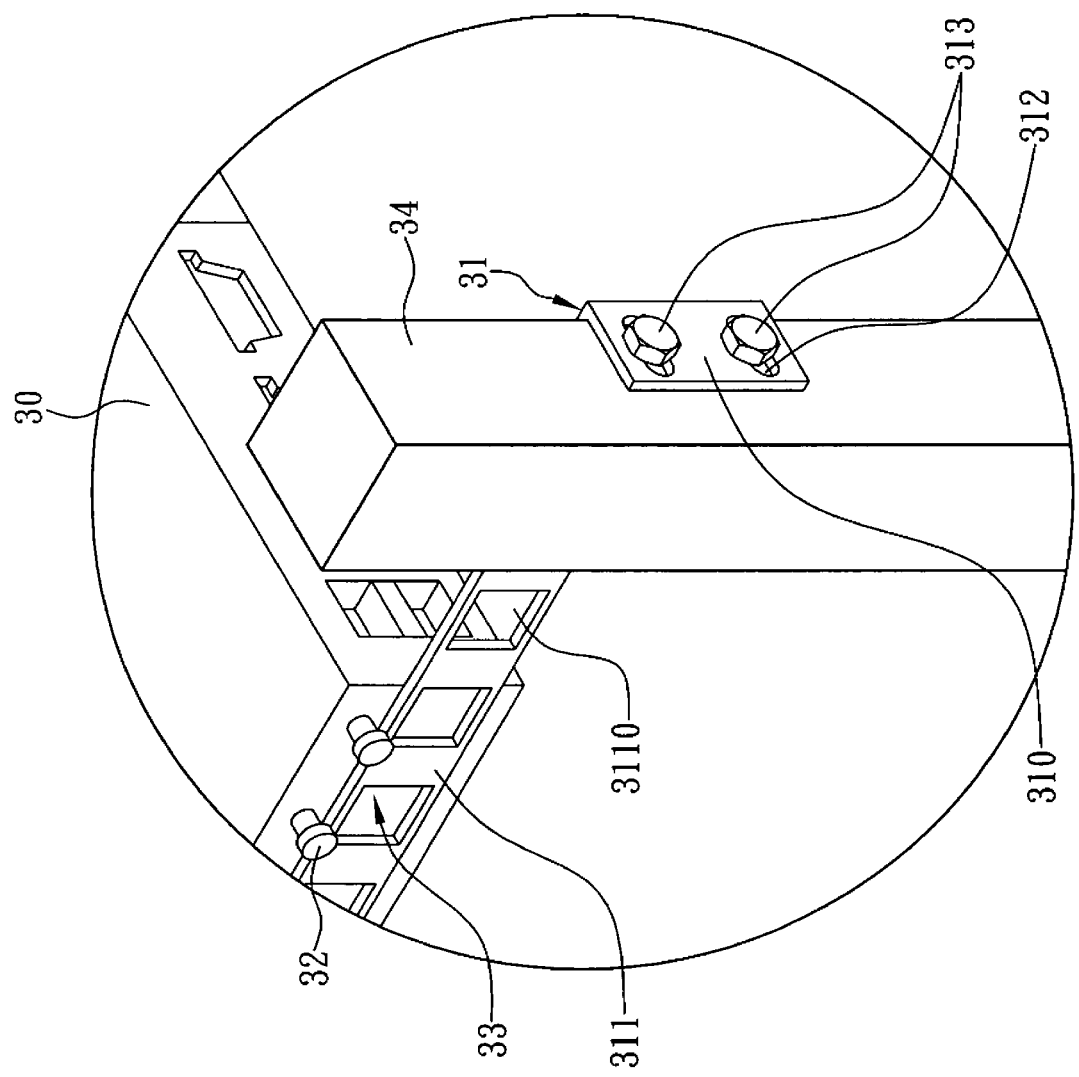
FIG. 5 is another enlarged view of a portion of a first preferred embodiment of the present invention.

When the depth of the rack 34 is greater than the depth of the network device 30 in accordance with the first preferred embodiment of the invention as shown in FIG. 5, each support portion 311 still can be slid into each corresponding slide rail 33 to support the weight of the network device 30. The invention not only improves the flexible combination of the network device 30 and the rack 34, but also greatly enhances the convenience and stability of the installation. In addition, manufacturers simply needs to manufacture the fixing element 31 with one size to fit network devices 30 and racks 34 of different specifications, and thus the invention greatly reduces the production cost and lower the level of difficulty on the management of materials and components.

With reference to FIGS. 3 to 5 for the first preferred embodiment of the invention, at least one opening 3110 is disposed on the support portion 311 of the fixing element 31, such that when each support portion 311 is slid into each slide rail 33 disposed on each corresponding side of the network device 30, the heat produced by the network device 30 can be dissipated from the openings 3110 to the outside. Such arrangement not only prevents the support portion 311 from hindering the thermal dissipation of the heat produced by the network device 30, but also reduces the weight of the fixing elements 31 (compared with the case of having no opening 3110 on the support portion 311 of each fixing element 31), such that system administrators can fix the network device 30 to the rack 34 by the fixing element 31 easily.

Figure 6:
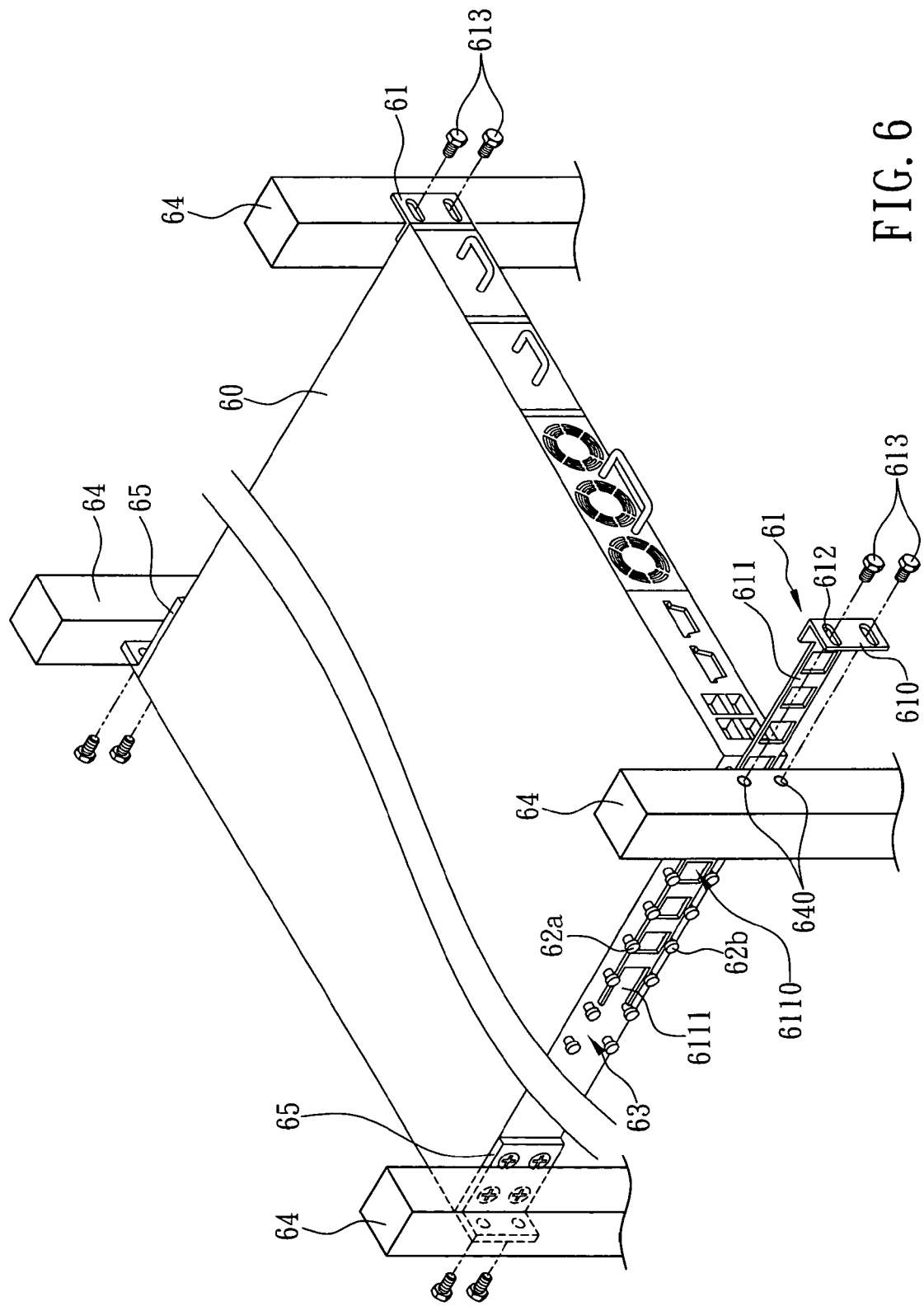
FIG. 6 is a perspective view of a second preferred embodiment of the present invention.
Figure 7:
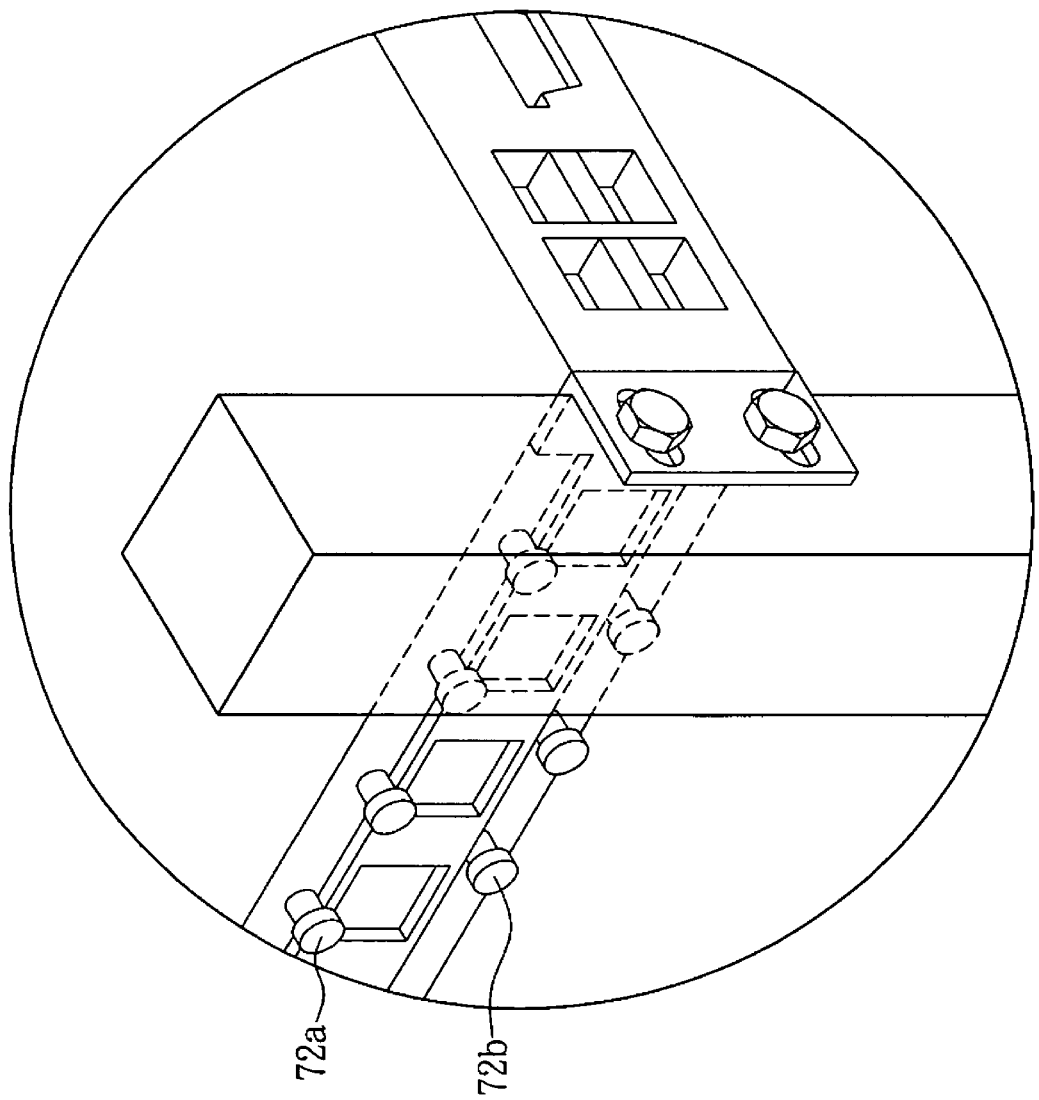
FIG. 7 is a perspective view of the present invention.

With reference to FIG. 6 for a second preferred embodiment of the present invention, the network device fixture comprises a network device 60 and two fixing elements 61, wherein at least one rail element 62a and one auxiliary rail element 62b are parallelly disposed on both sides of the network device 60 adjacent to the rear of the network device 60 respectively to form a slide rail 63 on each side of the network device 60. In FIG. 6, each auxiliary rail element 62b is disposed below each corresponding rail element 62a, but not limited to such arrangement only. Manufacturers can change the arrangement relation between each auxiliary rail element 62b and each rail element 62a according to actual design requirements. In FIG. 7, even if each auxiliary rail element 72b is not disposed below each corresponding rail element 72a (but the auxiliary rail elements 72b are arranged alternately), the expected effects of the present invention will not be affected.

In FIG. 6, the rail elements 62a and the auxiliary rail elements 62b form the slide rails 63 on both sides of the network device 60 respectively. The fixing element 61 comprises a locking portion 610 and a support portion 611, and the locking portion 610 includes two locking holes 612 thereon, and the support portion 611 is coupled perpendicularly to the locking portion 610, and the support portion 611 includes a slot 6111 and a plurality of openings 6110 for improving the heat dissipating effect. If the network device 60 is installed in a rack 64, and the front of both sides of the network device 60 is fixed to the front of the rack 64, the support portion 611 of each fixing element 61 can be slid into each corresponding slide rail 63, and each locking portion 610 can be secured into a fixing hole 640 of the rack 64 by a plurality of screws 613 such that the network device 60 can be stored in the rack 64 securely.

If the depth of the network device is much smaller than the depth of the rack, and the weight of the network device is relatively heavy (or the density is relatively greater), a portion or all of the intervals between the rail elements can be reduced to improve the supporting effect of the fixing element and prevent the network device from falling off or being damaged.

While the invention has been described by means of specific embodiments, numerous modifications and variations could be made thereto by those skilled in the art without departing from the scope and spirit of the invention set forth in the claims.

What is claimed is:

1. A network device fixture, comprising:
   a network device;
   at least one rail element, disposed at both sides of the network device adjacent to a rear of the network device respectively, wherein each of the rail elements is a rivet in a H-shape cross section;
   at least one auxiliary rail element, disposed at the sides of the network device adjacent to the rear of the network device, wherein each of the auxiliary rail elements is a rivet in a H-shape cross section, and the rail element and the auxiliary rail element form a slide rail therebetween on each of the sides of the network device; and
   two fixing elements, each having a locking portion and a support portion, wherein the locking portion has at least one locking hole disposed thereon and is coupled to the support portion, and an included angle between the support portion and the locking portion is equal to 90 degrees, such that when a front of the network device is fixed to a front of the rack, each of the support portions is slid into each of the slide rails corresponding thereto, and each of the locking portions is secured to a rear of the rack through each of the locking holes corresponding thereto.

2. The network device fixture of claim 1, wherein the support portion of the fixing element includes at least one opening.

3. The network device fixture of claim 1, wherein the support portion of the fixing element includes at least one slot.

* * * * *